(12) United States Patent
Tanabe

(10) Patent No.: US 10,404,326 B2
(45) Date of Patent: Sep. 3, 2019

(54) POWER TRANSMISSION APPARATUS

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/102,977

(22) Filed: Aug. 14, 2018

(65) Prior Publication Data

US 2018/0359002 A1    Dec. 13, 2018

Related U.S. Application Data

(63) Continuation of application No. 15/255,768, filed on Sep. 2, 2016, now Pat. No. 10,079,620.

(30) Foreign Application Priority Data

Sep. 4, 2015   (JP) .................................. 2015-175220

(51) Int. Cl.
*H04B 5/00* (2006.01)
*H04W 4/02* (2018.01)

(52) U.S. Cl.
CPC ......... *H04B 5/0037* (2013.01); *H04B 5/0031* (2013.01); *H04W 4/023* (2013.01)

(58) Field of Classification Search
CPC .. H04B 5/0037; H04B 5/0031; H04B 5/0012; H04B 5/0075; H04W 4/023; H02J 5/005; H02J 7/025; H02J 7/0031; H02J 2007/0037
See application file for complete search history.

(56) References Cited

U.S. PATENT DOCUMENTS

| 9,131,139 B2 | 9/2015 | Tanabe | |
|---|---|---|---|
| 2008/0174267 A1* | 7/2008 | Onishi | H02J 7/0031 320/108 |
| 2014/0184148 A1* | 7/2014 | Van Der Lee | H04B 5/0031 320/108 |

FOREIGN PATENT DOCUMENTS

| JP | 2007185017 A | 7/2007 |
|---|---|---|
| JP | 2007325339 A | 12/2007 |
| JP | 2012095435 A | 5/2012 |

OTHER PUBLICATIONS

Notice of Reasons for Refusal issued by the Japanese Patent Office dated May 27, 2019 in corresponding Japanese Patent Application No. 2015-175220, with English language translation.

* cited by examiner

*Primary Examiner* — Jianxun Yang
(74) *Attorney, Agent, or Firm* — Carter, DeLuca & Farrell LLP

(57) ABSTRACT

A power transmission apparatus includes a wireless power transmission unit that performs a power transmission process, a wireless communication unit that performs a data transfer process, and a control unit that determines whether or not an external apparatus entered in a predetermined range is an apparatus which has left the predetermined range during the data transfer process, and controls the power transmission process and the data transfer process based on whether the external apparatus entered in the predetermined range is the apparatus which has left the predetermined range during the data transfer process.

19 Claims, 8 Drawing Sheets

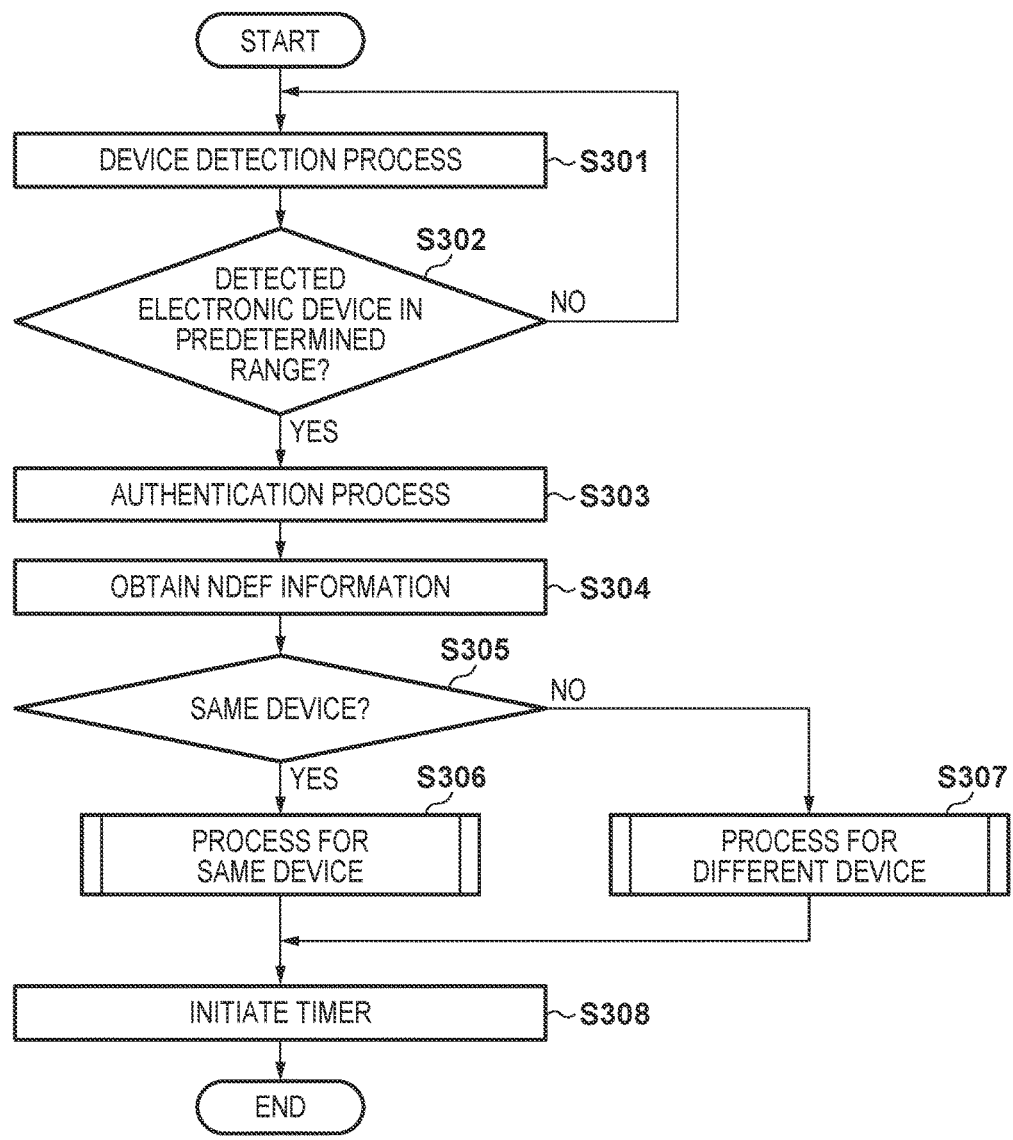

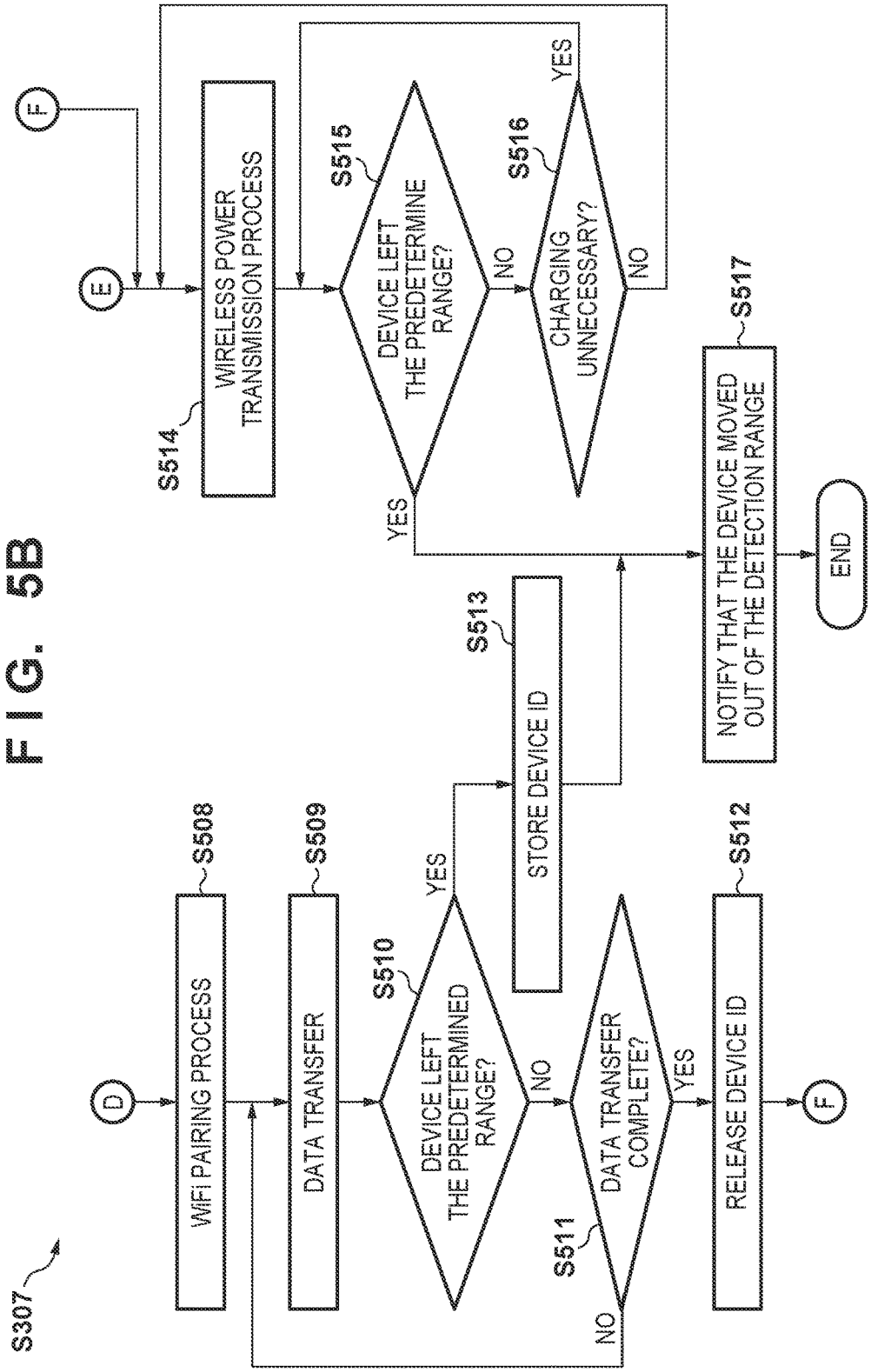

POWER TRANSMISSION APPARATUS

BACKGROUND

Field of the Invention

Aspects of the present invention generally relate to a power transmission apparatus capable of wireless communication and wireless power transmission, and a method of controlling a wireless communication and a wireless power transmission.

Description of the Related Art

Wireless power transmission systems that use an electromagnetic field resonance phenomenon or an electromagnetic induction phenomenon to transmit power wirelessly are known. There are those that have a wireless communication function in power transmission apparatuses that perform a wireless power transmission (see Japanese Patent Laid-Open No. 2007-325339). In Japanese Patent Laid-Open No. 2007-325339, a method of determining whether or not an external communication apparatus is an apparatus that can perform both wireless power transmission and wireless communication is recited.

There are cases in which it is better to perform either wireless power transmission or wireless communication preferentially depending on the state of a power receiving apparatus or the like, even if a power transmission apparatus can perform both wireless power transmission and wireless communication. However, in Japanese Patent Laid-Open No. 2007-325339, such control is not considered.

SUMMARY

According to one aspect of the present invention, a power transmission apparatus enables to control wireless power transmission and wireless communication.

According to one aspect of the present invention, a method enables to control wireless power transmission and wireless communication.

According to one aspect of the present invention, there is provided a power transmission apparatus comprising: a wireless power transmission unit that performs a power transmission process; a wireless communication unit that performs a data transfer process; and a control unit that (a) determines whether or not an external apparatus entered in a predetermined range is an apparatus which has left the predetermined range during the data transfer process, and (b) controls the power transmission process and the data transfer process based on whether the external apparatus entered in the predetermined range is the apparatus which has left the predetermined range during the data transfer process.

Further features and aspects of the present invention will become apparent from the following description of exemplary embodiments.

BRIEF DESCRIPTION OF THE DRAWINGS

FIG. 3 is a flowchart for illustrating a procedure to be performed in the power transmission apparatus 100.

FIG. 5A and FIG. 5B are a flowchart for illustrating a process to be performed when the power transmission apparatus 100 detects another device.

DESCRIPTION OF THE EMBODIMENTS

Exemplary embodiments, features, and aspects of the present invention will be described below with reference to the drawings. However, aspects of the present invention are not limited to the following embodiments.

First Embodiment

Figure 1:
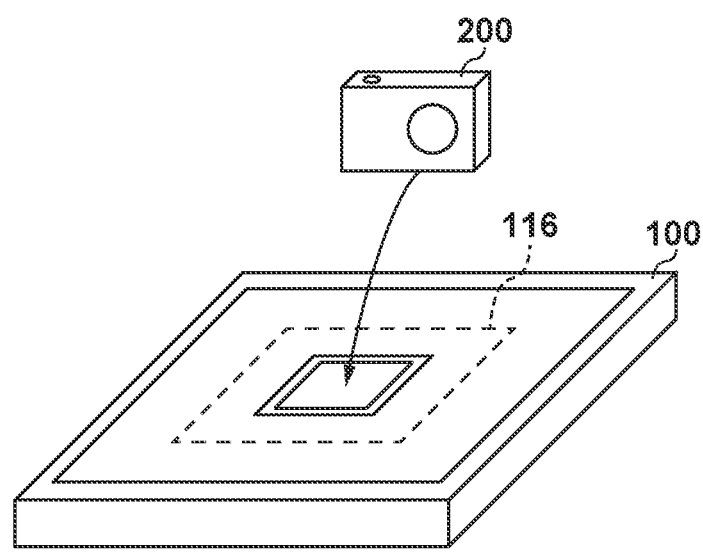
FIG. 1 is a view for illustrating an example of a configuration of a wireless power transmission system in a first embodiment.

FIG. 1 is a view for illustrating an example of a configuration of a wireless power transmission system in a first embodiment.

As illustrated in FIG. 1, the wireless power transmission system in the first embodiment includes a power transmission apparatus 100 and an electronic device 200. The power transmission apparatus 100 can operate as a power supply apparatus to supply power to the electronic device 200 wirelessly. The electronic device 200 can operate as a power receiving apparatus to perform a power reception process for receiving the transmitted power from the power transmission apparatus 100.

The power transmission apparatus 100, for example, can operate as a reader/writer apparatus of an NFC (Near Field Communication) specification. The power transmission apparatus 100 includes functions for performing close proximity wireless communication (for example, an NFC standard), the wireless communication conforming to a wireless LAN standard, and a function for transmitting power wirelessly. In addition, the power transmission apparatus 100 can detect whether or not the electronic device 200, which is an external apparatus, exists in a predetermined range from the power transmission apparatus 100 by a device detection unit 116. Thereby, the power transmission apparatus 100 can detect that the electronic device 200 approaches the power transmission apparatus 100 by the device detection unit 116.

The electronic device 200 may be an image capture apparatus such as a smart phone, a digital camera, a cellular phone with a camera and a digital video camera, or the like. The electronic device 200 may also be a playback apparatus that performs a playback of audio data or image data. The electronic device 200 may also be a driving apparatus such as a car. The electronic device 200 may also be an electronic device that is operated by power supplied from the power transmission apparatus 100 if a battery is not connected to the electronic device 200. The electronic device 200 includes functions for performing close proximity wireless communication (for example, an NFC standard), wireless communication conforming to a wireless LAN standard, and a function for power reception for receiving power transmitted wirelessly.

Figure 2:
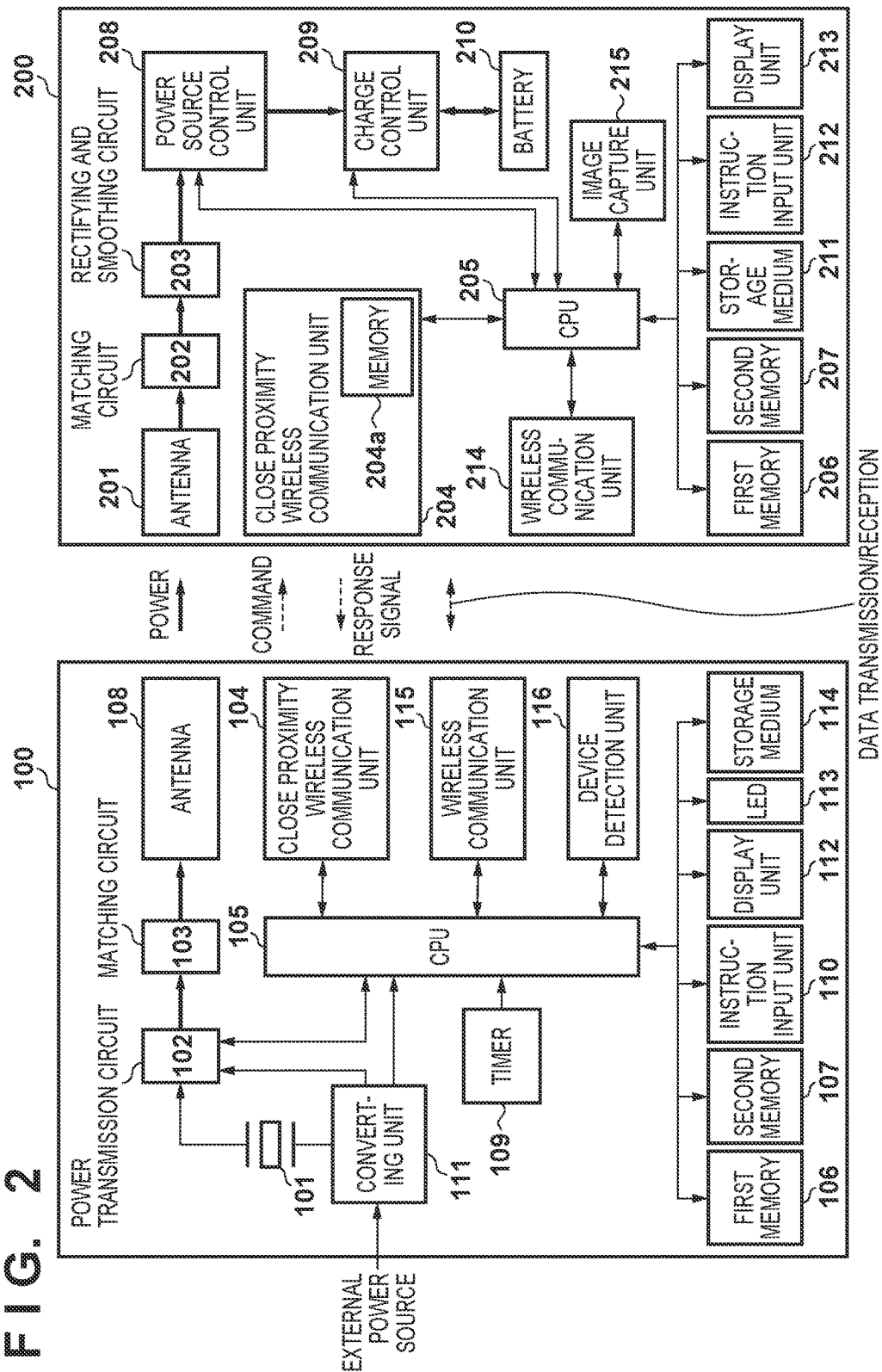
FIG. 2 is a block diagram for illustrating an example of components that a power transmission apparatus 100 comprises and an example of components that an electronic device 200 comprises.

FIG. 2 is a block diagram for illustrating an example of components that the power transmission apparatus 100 comprises and an example of components that the electronic device 200 comprises in the first embodiment.

In the power transmission apparatus 100, an oscillator 101 is driven by power supplied via a converting unit 111 from an external power source, and oscillates at an oscillation frequency used to control a power transmission circuit 102. Note that a crystal oscillator, for example, is used in the oscillator 101. The power transmission circuit 102 generates power to supply to the electronic device 200 via an antenna 108 in accordance with power supplied from the converting unit 111 and the oscillation output of the oscillator 101. The power transmission circuit 102 generates power to supply to the electronic device 200 by controlling the current flowing between the terminals of a source and a drain by causing a gate voltage of a FET in the power transmission circuit 102 to change in accordance with oscillation frequency of the oscillator 101. The power generated by the power transmission circuit 102 is supplied to a matching circuit 103. The power transmission circuit 102, by controlling the gate voltage of the FET in the power transmission circuit 102, can change and stop power outputted from the FET.

The matching circuit 103 includes a resonance circuit for resonating at a resonance frequency f by the antenna 108 and a capacitance in accordance with the oscillation frequency of the oscillator 101. Note, the resonance frequency f may be 50/60 Hz, which are commercial frequencies, and may be 10 through several hundred kHz, and may be a frequency around 10 MHz. The oscillation frequency of the oscillator 101 is in a state set to the resonance frequency f, and power generated by the power transmission circuit 102 is supplied to the antenna 108 via the matching circuit 103. A close proximity wireless communication unit 104 is a hardware block configured by a communication processing circuit for performing close proximity wireless communication and an antenna. In the first embodiment, the communication process conforming to the NFC standard is performed in the close proximity wireless communication unit 104. Note, the antenna 108 may be used for communication. In the first embodiment, a case when NFC is used as the close proximity wireless communication unit 104 is described, but wireless communication based on a Bluetooth (registered trademark) specification may be also used.

A CPU (central processing unit) 105 operates by power supplied via the converting unit 111 from an external power source, and can control each component of the power transmission apparatus 100 by executing one or more programs stored in a first memory 106. For example, the CPU 105 controls to supply power to the electronic device 200 by controlling the power transmission circuit 102. The CPU 105 controls communication with the electronic device 200 by controlling the close proximity wireless communication unit 104 and a wireless communication unit 115. The CPU 105 makes a request for device authentication and a request to obtain charge information to the electronic device 200 by controlling the close proximity wireless communication unit 104. The CPU 105 establishes a wireless communication connection by controlling the wireless communication unit 115, and performs transmission and reception of data of images and audio stored in a storage medium 114, for example, with the electronic device 200. In addition, the CPU 105 detects that the electronic device 200 has moved within a predetermined range or has moved outside the predetermined range (ceasing to exist in the predetermined range) by controlling the device detection unit 116.

In addition, the CPU 105 obtains from the electronic device 200 device information including information about the electronic device 200 and status information including information indicating a status of the electronic device 200 by controlling the close proximity wireless communication unit 104 or the wireless communication unit 115. The device information is information about a manufacturer name, a product name, a product model number, identification information, a serial number, and supported functions of the electronic device 200. Status information includes charge information of the electronic device 200. Further status information includes the existence or absence of an update of data in a storage medium 211, an enabled or disabled setting status of a close proximity wireless communication unit 204, an enabled or disabled setting status of a wireless communication unit 214, an existence or absence of the storage medium 211 and an opened or closed status of a lid of a storage unit therefor, and an existence or absence of a battery 210, and an opened or closed status of a lid of a storage unit therefor.

The first memory 106 stores one or more programs for controlling each component of the power transmission apparatus 100. The one or more programs stored in the first memory 106 are executed by the CPU 105. In addition, the first memory 106 stores image data of menus or the like that a display unit 112 is caused to display.

A second memory 107 is rewritable memory and stores information of control parameters related to each component of the power transmission apparatus 100, and information received from the electronic device 200 by the close proximity wireless communication unit 104. The antenna 108 is an antenna for outputting power generated by the power transmission circuit 102 to the exterior. The power transmission circuit 102 supplies power to the electronic device 200 via the antenna 108. A timer 109 measures the current time, and a time related to an operation or a process performed in the power transmission apparatus 100. Measured values are stored in a register in the timer 109. A threshold value for a time measured by the timer 109 is stored in the first memory 106 in advance.

An instruction input unit 110 provides the user interface to input a user instruction into the power transmission apparatus 100. The instruction input unit 110 comprises a power button that turns a power source of the power transmission apparatus 100 ON or OFF, a mode switching button that switches the operation mode of the power transmission apparatus 100, or the like, and each button is configured by a switch, a touch panel, or the like. The CPU 105 controls the power transmission apparatus 100 according to user instructions inputted via the instruction input unit 110. Note, the instruction input unit 110 may receive an instruction from a remote controller. In that case, the CPU 105 controls the power transmission apparatus 100 according to an instruction received from a remote controller.

The converting unit 111 converts alternating current power supplied from the external power source into the direct current power, and supplies the converted direct current power to each component of the power transmission apparatus 100 if it is connected between the external power source (for example, an alternating-current power supply) and the power transmission apparatus 100. The display unit 112 displays display content generated by the CPU 105. The display unit 112 comprises a display panel that is, for example, a liquid crystal panel, an organic EL panel, or the like, and a display control unit to control displaying in the display panel. An LED unit 113 comprises a light emitting diode, and notifies a user, by illumination control being performed by the CPU 105, that communication is being performed by control of the close proximity wireless communication unit 104, and that power is being outputted by control of the power transmission circuit 102. The storage medium 114 is a storage medium for storing image data or audio data, and in the first embodiment, it is configured by a flash memory, an HDD (hard disk drive), or the like. Note that the storage medium 114 is not limited to these elements, and for example a detachable type flash memory may be used.

The wireless communication unit 115 comprises a communication processing circuit for performing wireless communication and an antenna. The wireless communication unit 115 is a processing block for performing a communication process conforming to, for example, a wireless LAN (local area network) specification and an LTE (Long Term Evolution) specification.

The device detection unit 116 detects whether or not the electronic device 200 exists in a detectable range (corresponding to the predetermined range) by a sensor of the device detection unit 116. For example, the device detection unit 116 can be configured by a sensor such as a piezoelectric sensor, an ultrasonic sensor, a photo reflector or an inductive sensor. Alternatively, configuration may be taken such that the device detection unit 116 causes power for detection to be output from the power transmission circuit 102, to detect the existence of the electronic device 200 by capturing a change in impedance due to a change in the current and voltage thereof. Configuration may be taken so as to detect the electronic device 200 by whether enabling communication of the close proximity wireless communication unit 104 or not instead of the device detection unit 116.

Next, with reference to FIG. 2, explanation will be given for components that the electronic device 200 comprises.

In the electronic device 200, an antenna 201 is an antenna for receiving power supplied from the power transmission apparatus 100. The electronic device 200 receives power from the power transmission apparatus 100 via the antenna 201. A matching circuit 202 comprises a resonance circuit for performing an impedance matching so that the antenna 201 resonates at the same frequency as the resonance frequency f of the power transmission apparatus 100. The matching circuit 202 comprises a capacitor, a coil and a resistor similarly to the matching circuit 103, and configuration is taken such that the antenna 201 resonates at the same frequency as the resonance frequency f of the power transmission apparatus 100. The matching circuit 202 supplies power received via the antenna 201 to a rectifying and smoothing circuit 203. The matching circuit 202 supplies as a request some of power received via the antenna 201 to the close proximity wireless communication unit 204 left as an alternating current waveform. The rectifying and smoothing circuit 203 removes the request and noise from power received via the antenna 201, generates direct current power, and supplies the generated direct current power to a power source control unit 208. Note, the rectifying and smoothing circuit 203 comprises diodes for rectification, and generates the direct current power by either one of full wave rectification and half wave rectification.

The close proximity wireless communication unit 204 is a hardware block configured by an antenna and a communication processing circuit for performing close proximity wireless communication. The close proximity wireless communication unit 204 performs communications that conform to an NFC standard, for example. Note that in the first embodiment a case in which NFC is used is described, but wireless communication based on a Bluetooth standard may also be used. The antenna 201 may also be used for communication of the close proximity wireless communication unit 204. The close proximity wireless communication unit 204 has a memory 204a for storing data. A CPU (central processing unit) 205 can read and write data by accessing the memory 204a. For example, the memory 204a is managed by addresses, and the CPU 205 or the power transmission apparatus 100 can perform reading and writing of data to the memory 204a by designating a data size and an address at which access is desired. The memory 204a can be accessed by the close proximity wireless communication unit 104 in NFC communication with the power transmission apparatus 100. When the memory 204a is accessed from the power transmission apparatus 100, an interrupt notification is made to the CPU 205, and thereby the CPU 205 can recognize that the memory 204a is accessed from outside.

The CPU 205 by executing one or more programs stored in a first memory 206, can control each component of the electronic device 200. For example, the CPU 205, by controlling the power source control unit 208 and a charge control unit 209, supplies power supplied from the power transmission apparatus 100 to each component of the electronic device 200 to charge the battery 210. The CPU 205 performs communications by controlling the close proximity wireless communication unit 204 and the wireless communication unit 214. The CPU 205 can transmit a response to a device authentication request, and transmit a response to a charge information request. The CPU 205 establishes a wireless communication connection with the power transmission apparatus 100 by the wireless communication unit 214 using information obtained via a close proximity wireless communication between the close proximity wireless communication unit 204 and the close proximity wireless communication unit 104. The CPU 205 uses the wireless communication for which the connection is established to transmit data such as images, audio, and the like stored in the storage medium 211, for example, to the power transmission apparatus 100, and to receive various data from the power transmission apparatus 100.

The first memory 206 stores one or more programs for controlling each component of the electronic device 200. Device information including various information related to the electronic device 200 is also stored in the first memory 206. The one or more programs stored in the first memory 206 are executed by the CPU 205.

A second memory 207 is a rewritable memory, and stores information such as control parameters related to each component of the electronic device 200, and information transmitted from the power transmission apparatus 100. The power source control unit 208 is configured from a switching regulator, a linear regulator, or the like and supplies direct current power, which is supplied from either the rectifying and smoothing circuit 203 or an external power source, to each component of the electronic device 200 such as the charge control unit 209.

The charge control unit 209 charges the battery 210 in accordance with power supplied from the power source control unit 208. The charge control unit 209 periodically detects the charge status of the battery 210 connected to the electronic device 200, and stores it in the second memory 207 as charge information which includes information indicating the charge status of the battery 210.

The battery 210 is a chargeable secondary battery, and is removable from the electronic device 200. The battery 210 is, for example, a lithium ion battery or the like. The battery 210 supplies power to each component of the electronic device 200 in a case in which there is no power supply via the power source control unit 208, or the like. For example, in a case when power transmitted from the power transmission apparatus 100 is set to be low during communication of the wireless communication unit 115, and in a case when power supplied from the power transmission apparatus 100 is stopped, power is supplied to each of the components of the electronic device 200 from the battery 210. There is a lid on a storage unit of the battery 210, and an opened or closed status of the lid is notified to the CPU 205 from the storage unit of the battery 210.

The storage medium 211 is a storage medium for storing image data or audio data, and is configured by a flash memory or an HDD (hard disk drive). The storage medium 211 may be a detachable type flash memory. If the storage medium 211 is of a detachable type, there is a lid on the storage unit of the storage medium 211, and an opened or closed status of the lid is notified to the CPU 205. Note that when the CPU 205 updates the data of the storage medium 211, information of "existence or absence of a data update" which is one kind of status information is changed to "there is an update". The CPU 205 changes the information of "existence or absence of a data update" to "no update" in a case when it has completed transferring data of the storage medium 211 to the power transmission apparatus 100.

An instruction input unit 212 provides the user interface to input a user instruction into the electronic device 200. The instruction input unit 212 comprises a power button that turns a power source of the electronic device 200 ON or OFF, a mode switching button that switches the operation mode of the electronic device 200, or the like, and each button is configured by a switch, a touch panel, or the like. The CPU 205 controls the electronic device 200 according to user instructions inputted via the instruction input unit 212. Note, the instruction input unit 212 may control the electronic device 200 according to an instruction received from a remote controller. A user can select whether or not to enable the close proximity wireless communication unit 204 by inputting an instruction to the instruction input unit 212 while viewing a menu displayed on a display unit 213. Similarly, a user can select whether or not to enable the wireless communication unit 214 by inputting an instruction to the instruction input unit 212 while viewing a menu displayed on the display unit 213. In a case when it is selected to enable or disable the wireless communication unit 214, the CPU 205 updates status information to update information for indicating whether the wireless communication unit 214 is enabled or disabled.

The display unit 213 comprises a liquid crystal panel or an organic EL panel. The display unit 213 is configured in a vari-angle movable form, or the like. The wireless communication unit 214 is configured by a communication processing circuit for performing wireless communication and an antenna. The wireless communication unit 214 can perform wireless communication that conforms to a wireless LAN standard, for example.

An image capture unit 215 comprises an optical lens, a CMOS sensor, a digital image processing unit, or the like, and is a processing block for obtaining a captured image by converting an analog signal inputted via an optical lens into digital data. The captured image obtained by the image capture unit 215 is stored in the second memory 207, and processed based on the control of the CPU 205. For example, a captured image stored in the second memory 207 is stored in the storage medium 211, and is transmitted to an external apparatus using the wireless communication unit 214. Also, the image capture unit 215 comprises a lens control unit, and based on an instruction from the CPU 205, control such as zooming, focusing, and aperture adjustment is performed.

Note that the antenna 108 and the antenna 201 may be helical antennas and may be loop antennas, and may be planar antennas such as meander line antennas.

In the first embodiment, the wireless power transmission between the power transmission apparatus 100 and the electronic device 200 supplies power wirelessly to the electronic device 200 from the power transmission apparatus 100 by resonant magnetic coupling or resonant electric field coupling. However, a wireless power transmission method in the first embodiment, and in a later described second embodiment is not limited to a method that uses resonant magnetic coupling or resonant electric field coupling, and for example may be a method in which power is supplied wirelessly to the electronic device 200 from the power transmission apparatus 100 by electric field coupling. Alternatively, it may be a method by which power is supplied wirelessly from the power transmission apparatus 100 to the electronic device 200 by electromagnetic induction.

In the first embodiment, the power transmission apparatus 100 supplies power wirelessly to the electronic device 200, and the electronic device 200 receives power wirelessly from the power transmission apparatus 100. However, in the first embodiment and other embodiments, "wirelessly" may be reworded as "no-contact" or "non-contact".

FIG. 3 is a flowchart for illustrating a procedure to be performed in the power transmission apparatus 100.

In step S301, the CPU 105 performs a device detection process for detecting whether or not the electronic device 200 moved within the predetermined range in which it can be detected based on the detection result of the electronic device 200 by the device detection unit 116. Note that the predetermined range is a range in which it is possible to detect the electronic device 200 by the device detection unit 116, and the CPU 105 detects the electronic device 200 by controlling the device detection unit 116. Alternatively, configuration may be taken such that the electronic device 200 moving into the predetermined range (being present) is detected in accordance with close proximity wireless communication by the close proximity wireless communication unit 104 being possible. In such a case, the CPU 105 detects the electronic device 200 by controlling the close proximity wireless communication unit 104 to transmit a request for polling in order to detect a device periodically, and receiving a response. For example, if NFC communication is performed, the presence of the electronic device 200 which is capable of NFC communication is detected by transmitting a SENS_REQ command and a receiving a SENS_RES response. After the device detection process of the electronic device 200 is performed, the CPU 105 advances from step S301 to step S302.

In step S302, the CPU 105 determines whether or not it was possible to detect the electronic device 200 in the device detection process of step S301. The CPU 105 advances from step S302 to step S303 if the electronic device 200 can be detected in the device detection process (YES in step S302). On the other hand, the CPU 105 returns from step S302 to step S301 and repeats the above-described processes (step S301 and step S302) if the electronic device 200 is not detected in the device detection process (NO in step S302).

In step S303, the CPU 105 controls the close proximity wireless communication unit 104 to perform an authentication process with the detected electronic device 200.

In step S304, the CPU 105 obtains from the electronic device 200 NDEF (NFC Data Exchange Format) data including device information and status information by controlling the close proximity wireless communication unit 104. Note that the device information and the status information is stored in the memory 204a that the close proximity wireless communication unit 204 of the electronic device 200 comprises (step S603 of FIG. 6).

In step S305, the CPU 105 compares an identification information IDa obtained as device information in step S304 and identification information IDb stored in the second memory 107. Though described later, the identification information IDb which is stored in the second memory 107 indicates an electronic device which moved from within the predetermined range to outside of the predetermined range during a data transfer process using the wireless communication unit 115. Accordingly, by comparing the identification information IDa and the identification information IDb, the CPU 105 can determine whether or not the electronic device 200 detected in step S301 is the same electronic device as the electronic device which moved from within the predetermined range to outside of the predetermined range during a data transfer process using the wireless communication unit 115. Note that hereinafter, the electronic device 200 detected in step S301 is determined as a same electronic device 200A when it is determined that the identification information IDa and the identification information IDb are the same, and the electronic device 200 detected in step S301 is determined as a different electronic device 200B when it is determined that the identification information IDa and the identification information IDb are different. The CPU 105 advances from step S305 to step S306 if the electronic device 200 detected in step S301 is determined as the same electronic device 200A (YES in step S305). On the other hand, if the electronic device detected in step S301 is determined as the different electronic device 200B (NO in step S305), the CPU 105 advances from step S305 to step S307.

In step S306, the CPU 105 performs a process (including a data transfer process and a wireless power supply process) for a case when the electronic device 200 detected in step S301 is determined as the same electronic device 200A. Details of the process to be performed in step S306 are later described using FIG. 4A and FIG. 4B. When the process of step S306 completes, the CPU 105 advances to step S308.

In step S307, the CPU 105 performs a process (including a data transfer process and a wireless power supply process) for a case when the electronic device 200 detected in step S301 is determined as the different electronic device 200B. Details of the process to be performed in step S307 are later described using FIG. 5A and FIG. 5B. When the process of step S307 completes, the CPU 105 advances to step S308.

In step S308, the CPU 105 initiates a timer measurement by controlling the timer 109. This timer value (hereinafter referred to as timer value T1) is stored in a register within the timer 109. After that, the CPU 105 completes the procedure illustrated in FIG. 3. Note that the timer 109 performs a timer measurement irrespective of the operation of the CPU 105, and stores a measured value (the timer value T1) in a register. Because the processes of step S306 and step S307 terminate by the electronic device 200 moving outside of the predetermined range, the timer value T1 of the timer activated in step S308 indicates an elapsed period from which the electronic device 200 moved outside of the predetermined range.

Figure 4A:
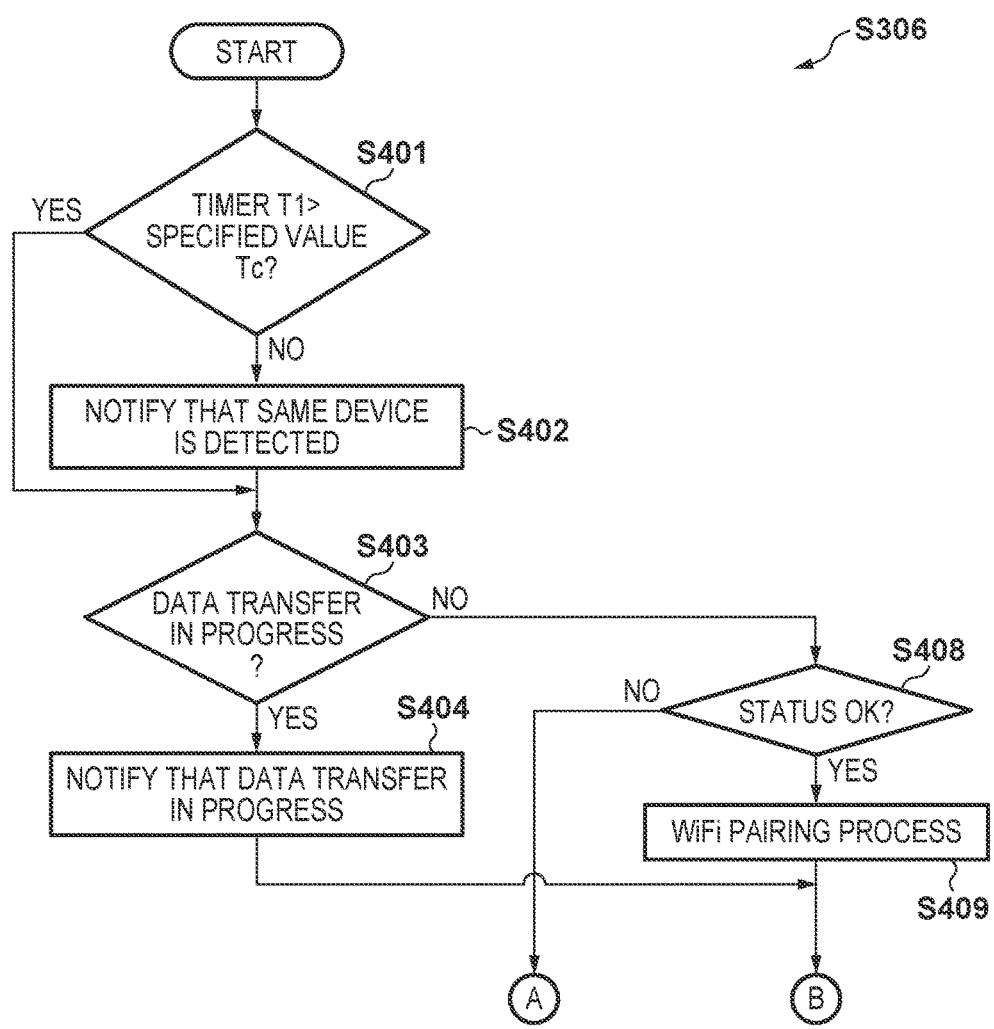
FIG. 4A and FIG. 4B are a flowchart for illustrating a process to be performed when the power transmission apparatus 100 detects the same device.
Figure 4B:
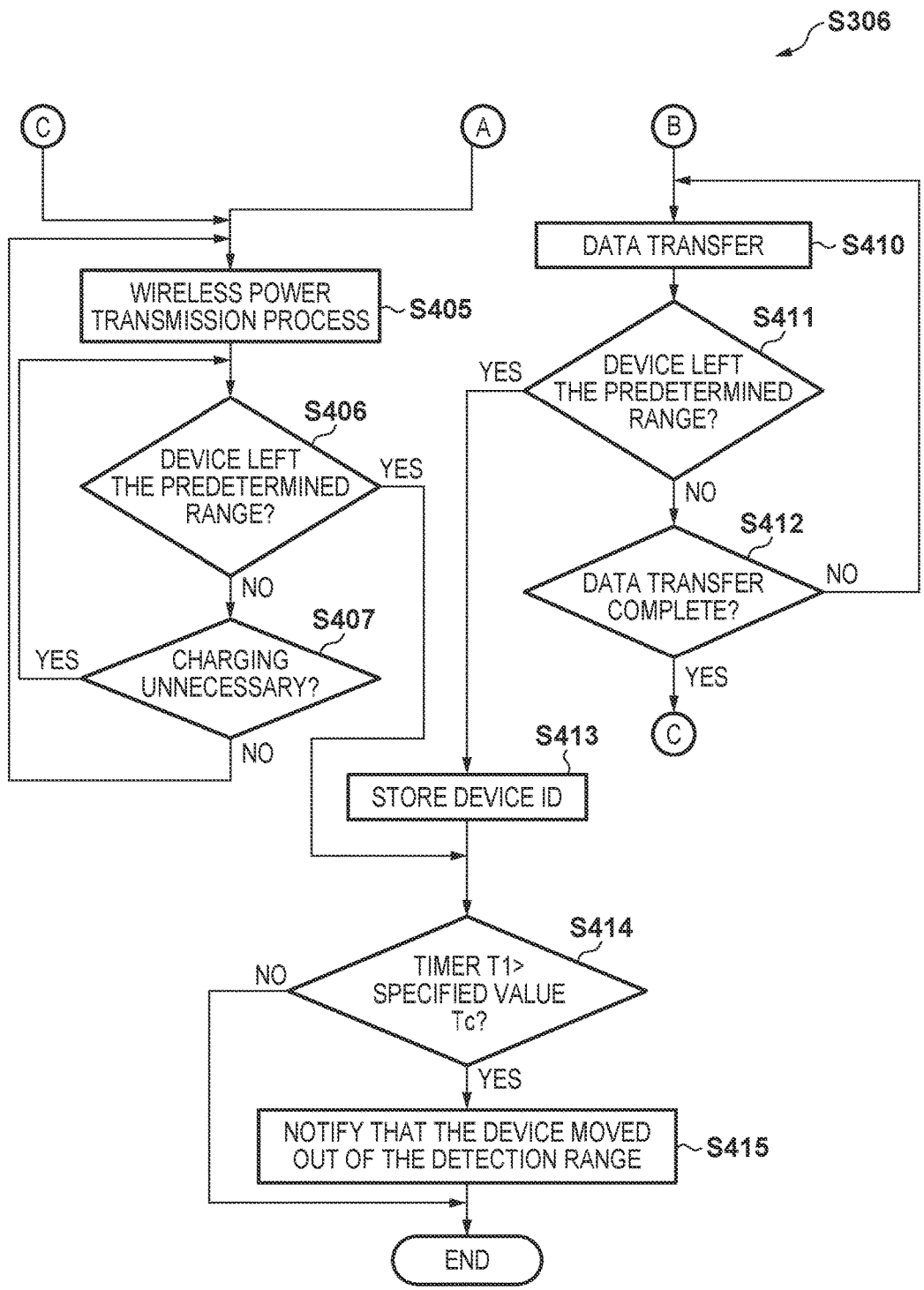

In FIG. 4A and FIG. 4B, a process (corresponding to the process of step S306) to be performed when the electronic device 200 detected in step S301 is determined as the same electronic device 200A is illustrated.

In step S401, the CPU 105 stores in the second memory 107 the timer value T1 (an elapsed period from when an electronic device moved out of the predetermined range) stored in a register of the timer 109, and compares the timer value T1 with a timer reference value Tc stored in the second memory 107. If the timer value T1 is larger than the reference value Tc (YES in step S401), the CPU 105 advances from step S401 to step S403. On the other hand, if the timer value T1 is less than or equal to the reference value Tc (YES in step S401), the CPU 105 advances from step S401 to step S402.

In step S402, the CPU 105 controls the display unit 112 and the LED unit 113 to notify a user that the same electronic device 200A was detected. Note that by the above described process, if a predetermined period (Tc) passed since an electronic device left the predetermined range, it is not notified that the same electronic device 200A was detected even if the electronic device 200 detected in step S301 is determined as the same electronic device 200A. Thereafter the CPU 105 advances from step S402 to step S403.

In step S403, the CPU 105 determines whether or not a previous data transfer process is in progress. If data is received from the electronic device 200A via the wireless communication unit 115, the CPU 105 determines that the previous data transfer process is in progress. Also, if data is transmitted to the electronic device 200A via the wireless communication unit 115, the CPU 105 determines that the previous data transfer process is in progress. If the previous data transfer process is in progress (YES in step S403), the CPU 105 advances from step S403 to step S404. On the other hand, if the previous data transfer process is not in progress (NO in step S403), the CPU 105 advances from step S403 to step S408.

In step S404, the CPU 105 controls the display unit 112 and the LED unit 113 to notify a user that the previous data transfer process with the electronic device 200 detected in step S301 is currently performed. Thereafter the CPU 105 advances from step S404 to step S410. With this, the CPU 105 causes the previous data transfer process that is currently performed to continue, waits for completion of the previous data transfer process, and initiates a wireless power transmission process (NO in step S411, YES in step S412, and step S405).

In step S408, the CPU 105 determines, using status information obtained via the close proximity wireless communication unit 104 or the wireless communication unit 115 from the electronic device 200A, whether or not there is no problem in performing a new data transfer process (other than the previous data transfer process) via the wireless communication unit 115. For the status information, for example, the existence or absence of an update of data stored in the storage medium 211, an enabled or disabled setting status of the wireless communication unit 214, the existence or absence of the storage medium 211, and an opened or closed status for the lid of the storage unit of the storage medium 211 can be considered. If data stored in the storage medium 211 is not updated, the wireless communication unit 214 is set to be disabled, there is no storage medium 211, or the lid of the storage unit of the storage medium 211 is open, there is a problem in performing the new data transfer process via the wireless communication unit 115. If there is no problem in performing the new data transfer process via the wireless communication unit 115 (YES in step S408), the CPU 105 advances from step S408 to step S409. If there is a problem in performing the new data transfer process via the wireless communication unit 115 (NO in step S408), the CPU 105 advances from step S408 to step S405. In step S405, the CPU 105 initiates a power transmission process.

In this way, if the same electronic device 200A is detected and the electronic device 200A is not in a data transmission or reception process, status information is inspected and it is determined whether or not the new data transfer process is prepared to perform. Then, if it is determined from the status information that the new data transfer process is not prepared to perform, the power transmission process of step S405 is initiated. If it is determined from the status information that the new data transfer process is prepared to perform, the new data transfer process is performed in step S410, and the completion of the new data transfer process is waited, and then a power transmission process is initiated. Here, the case where it is determined that the new data transfer process is prepared to perform is a case where it is determined from the status information that data to be transferred (e.g., updated data) exists in the storage medium 211 or the electronic device 200 is in a state that the new electronic device 200 can store data in the storage medium 211.

Steps S405 through S407 are related to the power transmission process. Firstly, in step S405, the CPU 105 controls the close proximity wireless communication unit 104 or the wireless communication unit 115 to obtain NDEF data including status information and charge information. The CPU 105 initiates wireless power transmission (hereinafter referred to as wireless power supply) to the electronic device 200A via the matching circuit 103 and the antenna 108 by controlling the power transmission circuit 102 after obtaining information (status information, charge information) related to wireless power transmission from the electronic device 200A. Thereafter the CPU 105 advances from step S405 to step S406.

In step S406, the CPU 105 determines whether or not the electronic device 200A moves out of the predetermined range. For example, the CPU 105 detects whether or not the electronic device 200A moved out of the predetermined range by controlling the device detection unit 116. Alternatively, configuration may be taken such that the CPU 105 detects whether or not the electronic device 200A moved out of the predetermined range by causing the close proximity wireless communication unit 104 to transmit a request for polling in order to detect the electronic device 200A periodically, and receiving a response. For example, if it is NFC communication, it is possible to perform an NDEF data read to determine whether or not NDEF data can be read, and whether or not the electronic device 200A moved out of the predetermined range. The CPU 105 advances from step S406 to step S414 in the case when it is detected that the electronic device 200A moves out of the predetermined range (YES in step S406). On the other hand, the CPU 105 advances from step S406 to step S407 in the case when the electronic device 200A does not move out of predetermined range (NO in step S406).

In step S407, the CPU 105 determines whether or not a state in which charging is unnecessary is entered from charge information obtained from the electronic device 200A. The state in which charging is unnecessary is a state in which, for example, the battery 210 became fully charged, or an error state such as where the battery 210 is removed from the electronic device 200A. If it is determined that the state is such that charging is unnecessary (YES in step S407), the CPU 105 returns from step S407 to step S406. On the other hand, if it is determined that the state is such that charging is necessary (NO in step S407), the CPU 105 returns from step S407 to step S405 and continues the wireless power transmission. Note that in the first embodiment, it is assumed that pulse charging, where a transmission state in which a transmission from the power transmission circuit 102 is performed and an idle state in which transmission is idle are repeated periodically, is performed and it is assumed that a charge by one pulse or a predetermined number of pulses is executed every time the process of step S405 is executed. Accordingly, after determining that charging is unnecessary in step S407, the wireless power supply terminates by not returning to step S405. However, if the power transmission circuit 102 is configured to continuously execute transmission, a process for stopping transmission of the power transmission circuit 102 in a case when it is determined that charging is unnecessary becomes necessary in step S407.

On the other hand, in step S408, if it is determined from the status information that the new data transfer process (other than the previous data transfer process) is prepared to perform, communication control for establishing communication with the electronic device 200A by the wireless communication unit 115 and performing the new data transfer process is initiated. Firstly, in step S409, the CPU 105 transmits or receives by an NDEF data format pairing information for making a connection between the wireless communication unit 115 and the wireless communication unit 214 of the electronic device 200A by controlling the close proximity wireless communication unit 104. The pairing information is an IP (Internet Protocol) address, a password, a channel, an SSID (Service Set Identifier), or the like. The CPU 105 uses the pairing information obtained from the electronic device 200A to establish a connection between the wireless communication unit 115 and the wireless communication unit 214 of the electronic device 200A. Thereafter the CPU 105 advances from step S409 to step S410.

When the CPU 105 advances from step S409 to step S410, the CPU 105, by controlling the wireless communication unit 115, initiates the new data transfer process with the electronic device 200A via the wireless communication established in step S409. In the new data transfer process, data stored in the storage medium 211 of the electronic device 200A is obtained and stored in the storage medium 114, or data stored in the storage medium 114 is transmitted to the electronic device 200A.

When the CPU 105 advances from step S404 to step S410, the CPU 105 continues the previous data transfer process using the wireless communication unit 115.

In step S411, the CPU 105 determines whether or not the electronic device 200A moves out of the predetermined range. Note that the process performed in step S411 is similar to the process performed in step S406. The CPU 105 advances from step S411 to step S413 in the case when it is detected that the electronic device 200A moves out of the predetermined range (YES in step S411). On the other hand, the CPU 105 advances from step S411 to step S412 in the case when the electronic device 200A does not move out of the predetermined range (NO in step S411).

In step S412, the CPU 105 determines whether or not transmission or reception of data is completed. If the transmission or reception of data is completed (YES in step S412), the CPU 105 advances from step S412 to step S405, and initiates a wireless power supply process. On the other hand, if the transmission or reception of data is not completed (NO in step S412), the CPU 105 returns from step S412 to step S410, and continues the previous or new data transfer process using the wireless communication unit 115.

In step S413, the CPU 105 stores the identification information IDa obtained from the device information as the identification information IDb in the second memory 107 in order to use it in the process of step S305.

In step S414, the CPU 105 compares the timer value T1 stored in the second memory 107 and the timer reference value Tc stored in the second memory 107. If the timer value T1 is larger than the reference value Tc (YES in step S414), the CPU 105 advances from step S414 to step S415. On the other hand, if the timer value T1 is the reference value Tc or less (NO in step S414), the CPU 105 causes the process illustrated in FIG. 4A and FIG. 4B to terminate.

In step S415, the CPU 105 controls the display unit 112 and the LED unit 113 to notify the user that the electronic device 200A moved out of the predetermined range. After that, the CPU 105 causes the process illustrated in FIG. 4A and FIG. 4B to terminate.

Note that in the above described procedure, step S408 begins if it is determined that the previous data transfer process is not in progress in step S403. However, the present invention is not limited to this. For example, configuration may be taken to cause the transmission of power to be initiated in accordance with the previous data transfer process completing if the same electronic device 200A is detected. This processing is realized by making the destination of the NO branch of step S403 to be step S405.

Figure 5A:
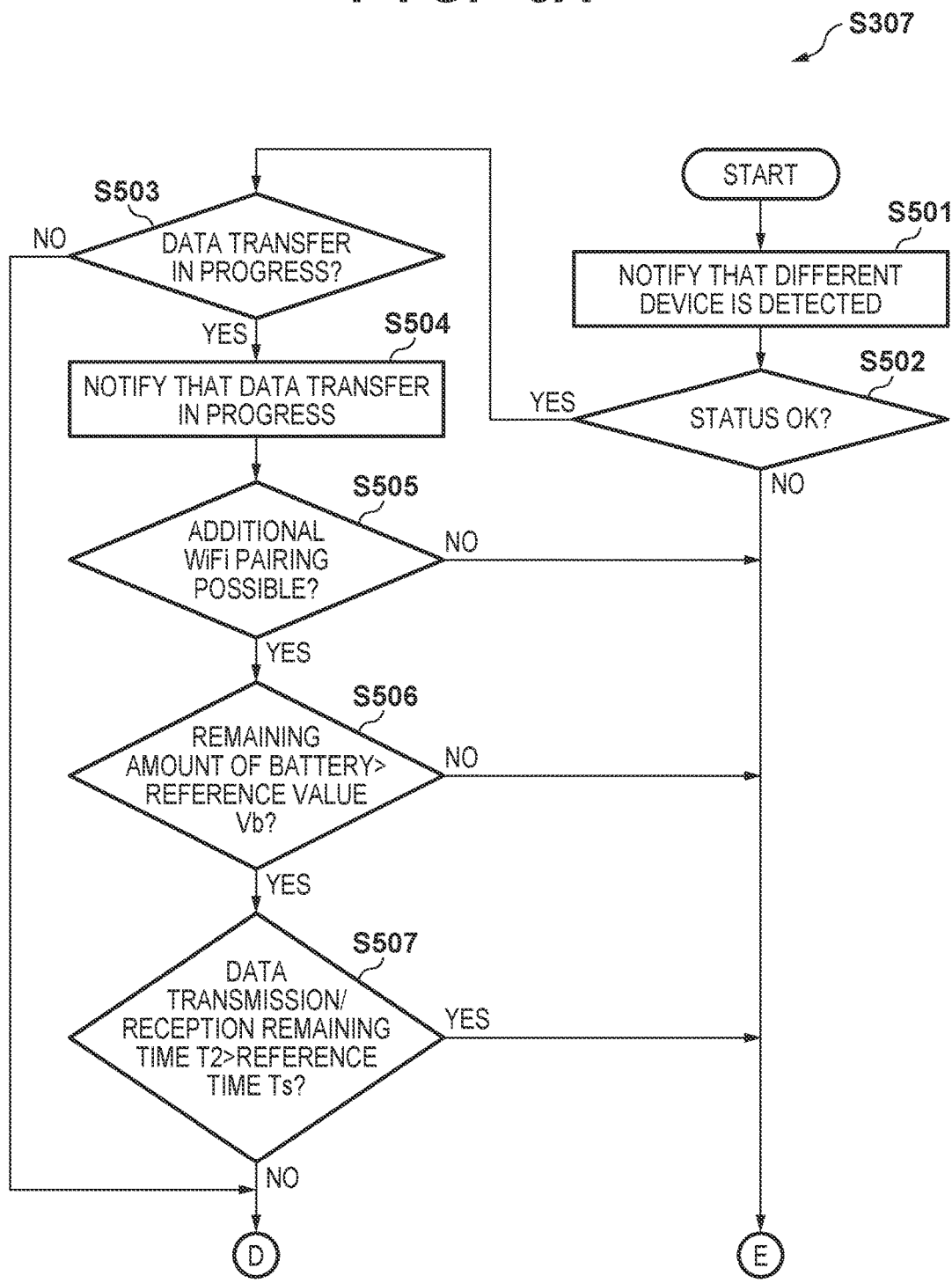

Next, using the flowchart of FIG. 5A and FIG. 5B, a process (corresponding to the process of step S307) to be performed when the electronic device 200 detected in step S301 is determined as the different electronic device 200B is described.

In step S501, the CPU 105 controls the display unit 112 and the LED unit 113 to notify a user that the different electronic device 200B was detected.

In step S502, the CPU 105 determines, using status information obtained via the close proximity wireless communication unit 104 or the wireless communication unit 115 from the electronic device 200B, whether or not there is no problem in performing a new data transfer process via the wireless communication unit 115. For example, the CPU 105 determines whether or not data to be transferred (e.g., updated data) exists in the storage medium 211 and the electronic device 200B is in a state in which the new data transfer process can be performed. Note that the process performed in step S502 is similar to the process performed in step S408. If there is no problem in performing the new data transfer process via the wireless communication unit 115 (YES in step S502), the CPU 105 advances from step S502 to step S503. On the other hand, if there is a problem in performing the new data transfer process via the wireless communication unit 115 (NO in step S502), the CPU 105 advances from step S502 to step S514. In step S514, the CPU 105 initiates a power transmission process (i.e., wireless power supply).

In step S503, the CPU 105 determines whether or not a previous data transfer process is currently performed via the wireless communication unit 115 with an electronic device other than the electronic device 200. Note that the process performed in step S503 is similar to the process performed in step S403. However, in the case of step S503, the electronic device other than the electronic device 200B performs the previous data transfer process. If transmission or reception of data with the electronic device other than the electronic device 200B is occurring (YES in step S503), the CPU 105 advances from step S503 to step S504. On the other hand, if transmission or reception of data with the electronic device other than the electronic device 200B is not occurring (NO in step S503), the CPU 105 advances from step S503 to step S508 in order to perform the new data transfer process with the electronic device 200B.

In step S504, the CPU 105 controls the display unit 112 and the LED unit 113 to notify that the data transmission or reception is currently performed with an electronic device other than the electronic device 200 detected in step S301. Then the CPU 105 advances from step S504 to step S505.

In step S505, the CPU 105 determines whether or not a WiFi pairing process is possible in addition to the previous data transfer process that is currently performed. For example, the CPU 105 confirms whether there is surplus channels or bandwidth that the wireless communication unit 115 can use, and if it is possible to additionally activate an access point in a case where it activates one itself. The CPU 105 determines whether or not a WiFi pairing process between the wireless communication unit 115 and the wireless communication unit 214 of the electronic device 200B is possible by this confirmation. If the pairing process with the electronic device 200B is available (YES in step S505), the CPU 105 advances from step S505 to step S506. On the other hand, if the pairing process with the electronic device 200B is not available (NO in step S505), the CPU 105 advances from step S505 to step S514. In step S514, the CPU 105 initiates the wireless power supply to the electronic device 200B.

In step S506, the CPU 105 obtains a remaining amount of the battery 210 from the charge information of the electronic device 200B, and compares the remaining amount obtained from the second memory 107 with the reference value Vb. If the remaining amount of the battery 210 is larger than the reference value Vb (YES in step S506), the CPU 105 advances from step S506 to step S507. On the other hand, if the remaining amount of the battery 210 is equal to or less that the reference value Vb (NO in step S506), the CPU 105 advances from step S506 to step S514. In step S514, the CPU 105 initiates the wireless power supply to the electronic device 200B.

In step S507, the CPU 105 compares an estimated remaining time T2 until the previous data transfer process that is currently performed will complete and a reference time Ts stored in the second memory 107. If the remaining time T2 is larger than the reference time Ts (YES in step S507), the CPU 105 advances from step S507 to step S514. In step S514, the CPU 105 initiates the wireless power supply to the electronic device 200B. On the other hand, if the remaining time T2 is equal to or less than the reference time Ts (NO in step S507), the CPU 105 advances from step S507 to step S508. In step S508, the CPU 105 initiates the new data transfer process with the electronic device 200B.

In step S508, the CPU 105 transmits/receives by NDEF data format pairing information for making a connection between the wireless communication unit 115 and the wireless communication unit 214 of the electronic device 200B by controlling the close proximity wireless communication unit 104. Then, the CPU 105 uses the pairing information obtained from the electronic device 200B to establish a connection between the wireless communication unit 115 and the wireless communication unit 214 of the electronic device 200B. This WiFi pairing process is the same process as in step S409. The CPU 105 advances from step S508 to step S509.

In step S509, the CPU 105 performs the new data transfer process via the wireless communication unit 115 using the connection established with the electronic device 200B. For example, the CPU 105 controls the wireless communication unit 115 to obtain data stored in the storage medium 211 of the electronic device 200B and store it in the storage medium 114, or to transmit data stored in the storage medium 114 to the electronic device 200B. Note that the process performed in step S509 is similar to the process performed in step S410.

In step S510, the CPU 105 determines whether or not the electronic device 200B moved out of the predetermined range by controlling the device detection unit 116. Note that the process performed in step S510 is similar to the process performed in step S406. The CPU 105 advances from step S510 to step S513 in the case when it is detected that the electronic device 200B moves out of the predetermined range (YES in step S510). On the other hand, the CPU 105 advances from step S510 to step S511 in the case when the electronic device 200B does not move out of the predetermined range (NO in step S510).

In step S511, the CPU 105 determines whether or not transmission or reception of data is completed. Note that the process performed in step S511 is similar to the process performed in step S412. If the transmission or reception of data is completed (YES in step S511), the CPU 105 advances from step S511 to step S512. On the other hand, if the transmission or reception of data in not completed (NO in step S511), the CPU 105 returns from step S511 to step S509.

In step S512, the CPU 105 clears the value of the identification information IDb stored in the second memory 107. Thereafter the CPU 105 advances from step S512 to step S514. In step S514, the CPU 105 initiates the wireless power supply to the electronic device 200B. If the electronic device 200B leaves the predetermined range during the wireless power supply, the CPU 105, in step S513, stores in the second memory 107 the identification information IDa obtained from the device information as the identification information IDb. Thereafter the CPU 105 advances from step S513 to step S517.

If the wireless power supply to the electronic device 200B is initiated, the CPU 105, in step S514, controls the close proximity wireless communication unit 104 or the wireless communication unit 115 to obtain NDEF data including status information and charge information. The CPU 105 performs power transmission wirelessly to the electronic device 200B via the matching circuit 103 and the antenna 108 by controlling the power transmission circuit 102 after obtaining information (status information, charge information) related to wireless power transmission from the electronic device 200B. Note that the process performed in step S514 is similar to the process performed in step S405.

In step S515, the CPU 105 determines whether or not the electronic device 200B moved out of the predetermined range by controlling the device detection unit 116. Note that the process performed in step S515 is similar to the process performed in step S406. The CPU 105 advances from step S515 to step S517 in the case when it is detected that the electronic device 200B moves out of the predetermined range (YES in step S515). On the other hand, the CPU 105 advances from step S515 to step S516 in the case when the electronic device 200B does not move out of the predetermined range (NO in step S515).

In step S516, the CPU 105 determines whether or not a state in which charging is unnecessary is entered from charge information obtained from the electronic device 200B. Note that the process performed in step S516 is similar to the process performed in step S407. The CPU 105 stops transmission according to the power transmission circuit 102 by returning from step S516 to step S515 if it is determined that a state in which charging is unnecessary was entered (YES in step S516). On the other hand, if it a state in which charging is necessary (NO in step S516), the CPU 105 causes transmission by the power transmission circuit 102 to continue by returning from step S516 to step S514.

In step S517, the CPU 105 controls the display unit 112 and the LED unit 113 to notify the user that the electronic device 200B moved out of the predetermined range. After that, the CPU 105 causes the process illustrated in FIG. 5A to FIG. 5B to terminate.

Figure 6:
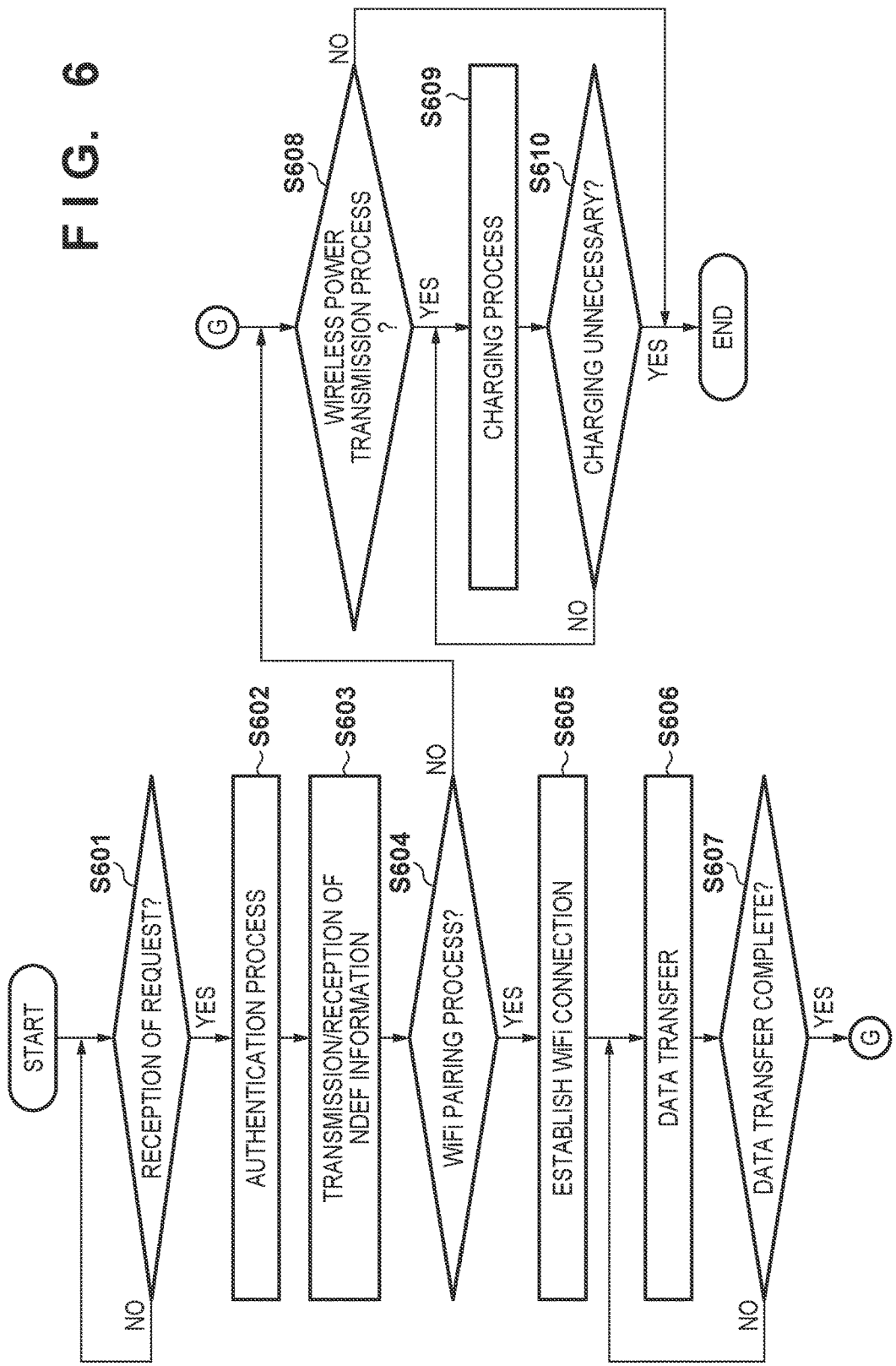
FIG. 6 is a flowchart for illustrating a procedure to be performed to be performed in the electronic device 200.

FIG. 6 is a flowchart for illustrating a procedure to be performed in the electronic device 200.

In step S601, the CPU 205 determines whether or not a communication is received from the power transmission apparatus 100 via the close proximity wireless communication unit 204. For example, the CPU 205 receives a request such as a SENS_REQ request. In a case when a communication is received from the power transmission apparatus 100 (YES in step S601), the CPU 205 advances from step S601 to step S602. In a case when a communication is not received from the power transmission apparatus 100 (NO in step S601), the CPU 205 repeats step S601.

In step S602, the CPU 205 performs an authentication process by controlling the close proximity wireless communication unit 204.

In step S603, the CPU 205 stores in the second memory 207 device information stored in the first memory 206 in advance. The CPU 205 stores in the memory 204a the device information and status information. In addition, when a read request is received from the electronic device 200, the CPU 205 controls the close proximity wireless communication unit 204 to notify NDEF information including the device information and the status information stored in the memory 204a to the power transmission apparatus 100. When a write request is received from the electronic device 200, CPU 205 stores in the second memory 207 the NDEF data stored in the memory 204a by controlling the close proximity wireless communication unit 204. Note that configuration may be taken such that the close proximity wireless communication unit 204 and the close proximity wireless communication unit 104 operate autonomously without respective control from the CPU 205 or the CPU 105, to perform communication of the above described information. The CPU 205 advances from step S603 to step S604.

In step S604, the CPU 205 determines whether or not the information of the NDEF format received in step S603 is pairing information for performing a connection between the wireless communication unit 214 and the wireless communication unit 115 of the power transmission apparatus 100. If there is pairing information (YES in step S604), the CPU 205 advances from step S604 to step S605. If there is no pairing information (NO in step S604), the CPU 205 advances from step S604 to step S608.

In step S605, the CPU 205 uses pairing information obtained from the power transmission apparatus 100 to establish a WiFi connection between the wireless communication unit 214 and the wireless communication unit 115 of the power transmission apparatus 100.

In step S606, the CPU 205 controls the wireless communication unit 214 to initiate a data transfer process with the power transmission apparatus 100. In the data transfer process, for example, data stored in the storage medium 211 is transmitted to the power transmission apparatus 100 via the wireless communication unit 214. Alternatively, data stored in the storage medium 114 is received from the power transmission apparatus 100 via the wireless communication unit 214, and is stored in the storage medium 211.

In step S607, the CPU 205 determines whether or not the data transfer process is completed. If the data transfer process is completed (YES in step S607), the CPU 205 advances from step S607 to step S608. On the other hand, if the data transfer process is not completed (NO in step S607), the CPU 205 returns from step S607 to step S606, and allows the data transfer process to continue.

Meanwhile, if in step S604 it is determined that there is no pairing information, the CPU 205 in step S608 determines whether or not the NDEF information stored in the memory 204a is information related to wireless power transmission. If there is information related to wireless power transmission (YES in step S608), the CPU 205 advances from step S608 to step S609. On the other hand, if there is no information related to the wireless power transmission (NO in step S608), the CPU 205 completes the procedure illustrated in FIG. 6. Alternatively, configuration may be taken such that clearance processing and other processing specified by the NDEF information such as a URI notification is performed.

In step S609, the CPU 205 controls the power source control unit 208 and the charge control unit 209 to charge the battery 210 via the antenna 201, the matching circuit 202, and the rectifying and smoothing circuit 203 with wireless power supplied from the power transmission apparatus 100. The CPU 205 controls the charge control unit 209 to obtain charge information including information indicating a remaining amount of the battery 210 and store it in the second memory 207. Firstly, the CPU 205, by controlling the close proximity wireless communication unit 204 or the wireless communication unit 214, transmits NDEF data including the status information and the charge information. The CPU 205 advances from step S609 to step S610.

Next, In step S610, the CPU 205 determines whether or not a state in which charging is unnecessary is entered from charge information stored in the second memory 207. The state in which charging is unnecessary is a state in which, for example, the battery 210 became fully charged, or an error state such as where the battery 210 is removed. If a state in which charging is unnecessary is entered (YES in step S610), the CPU 205 causes the processing illustrated in FIG. 6 to terminate. In a case of a state in which charging is necessary (NO in step S610), the CPU 205 returns from step S610 to step S609, and continues charging using power transmission from the power transmission apparatus 100.

According to the above first embodiment, it is possible to perform appropriate processing in accordance with the device detected during the data transfer process. Note that configuration may be taken such that so that the CPU 105 and the CPU 205 in the first embodiment are realized by dedicated hardwares.

Second Embodiment

Various functions, processes and methods explained in the first embodiment can be realized by a personal computer, a microcomputer, a CPU (central processing unit) or the like using a program. Hereinafter, in the second embodiment, a personal computer, a microcomputer, a CPU (central processing unit) or the like are referred to as "computer X". In the second embodiment, a program for controlling the computer X that realizes various functions, processes and methods explained in the first embodiment is referred to as "program Y".

The various functions, processes and methods explained in the first embodiment are realized by the computer X executing the program Y. In such a case, the program Y is supplied to the computer X via a computer-readable storage medium. The computer-readable storage medium in the second embodiment includes at least one of a hard disk apparatus, a magnetic storage apparatus, an optical storage apparatus, a magneto-optical storage apparatus, a memory card, a volatile memory, a non-volatile memory, or the like. The computer-readable storage medium in the second embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-175220, filed Sep. 4, 2015, which is hereby incorporated by reference herein in its entirety.

What is claimed is:

1. A power transmission apparatus comprising:
a wireless power transmission circuitry;
a first wireless communication circuitry;
a second wireless communication circuitry different from the first wireless communication circuitry;
a memory storing a program; and
a processor that executes the program stored in the memory,
wherein:
the second wireless communication circuitry performs a data transfer process with a first electronic device entered in a predetermined range,
the processor determines whether or not the first electronic device has moved out of the predetermined range in a case where the data transfer process is in progress,
the processor determines whether or not a second electronic device has entered in the predetermined range after the first electronic device has moved out of the predetermined range,
the processor determines whether or not the second electronic device entered in the predetermined range and the first electronic device moved out of the predetermined range are the same,
the processor determines whether or not the data transfer process is in progress in a case where the second electronic device entered in the predetermined range and the first electronic device moved out of the predetermined range are the same, and
the wireless power transmission circuitry transmits power to the second electronic device in a case where the second electronic device entered in the predetermined range and the first electronic device moved out of the predetermined range are the same and the data transfer process is not in progress.

2. The power transmission apparatus according to claim 1, further comprising a memory storing first identification information corresponding to the first electronic device moved out of the predetermined range,
wherein the first wireless communication circuitry receives second identification information corresponding to the second electronic device entered in the predetermined range, and
wherein the processor uses the first identification information and the second identification information to determine whether or not the second electronic device entered in the predetermined range and the first electronic device moved out of the predetermined range are the same.

3. The power transmission apparatus according to claim 1, wherein the wireless power transmission circuitry transmits power to the second electronic device after the data transfer process is completed, in a case where the second electronic device entered in the predetermined range and the first electronic device moved out of the predetermined range are the same and the data transfer process is in progress.

4. The power transmission apparatus according to claim 1, further comprising a display unit that notifies a user that the second electronic device is the same device as the first electronic device, in a case where the second electronic device entered in the predetermined range and the first electronic device moved out of the predetermined range are the same.

5. The power transmission apparatus according to claim 1, further comprising a display unit that notifies a user that the second electronic device is not the same device as the first electronic device, in a case where the second electronic device entered in the predetermined range and the first electronic device moved out of the predetermined range are not the same.

6. The power transmission apparatus according to claim 1, further comprising a device detection circuitry that includes a sensor detecting the second electronic device entered in the predetermined range.

7. The power transmission apparatus according to claim 1, wherein the first wireless communication circuitry performs a close proximity wireless communication with the second electronic device.

8. The power transmission apparatus according to claim 1, wherein the first wireless communication circuitry performs a wireless communication with the second electronic device, based on a near field communication (NFC) specification or a Bluetooth specification.

9. The power transmission apparatus according to claim 1, wherein the second wireless communication circuitry performs a wireless communication with the second electronic device, based on a wireless local area network (LAN) specification or a long term evolution (LTE) specification.

10. The power transmission apparatus according to claim 1, further comprising a matching circuitry and an antenna, wherein the wireless power transmission circuitry transmits power to the second electronic device via the matching circuitry and the antenna.

11. The power transmission apparatus according to claim 1, wherein the wireless power transmission circuitry transmits power to the second electronic device by magnetic coupling.

12. The power transmission apparatus according to claim 1, wherein the wireless power transmission circuitry transmits power to the second electronic device by electric field coupling.

13. The power transmission apparatus according to claim 1, wherein the wireless power transmission circuitry transmits power to the second electronic device by electromagnetic induction.

14. The power transmission apparatus according to claim 1, wherein the second electronic device includes an image capture apparatus.

15. The power transmission apparatus according to claim 1, wherein the second electronic device includes a phone or a camera.

16. The power transmission apparatus according to claim 1, wherein the second electronic device includes an apparatus that performs playback of audio data or image data.

17. The power transmission apparatus according to claim 1, wherein the second electronic device includes a vehicle.

18. A method comprising:
   causing a second wireless communication circuitry to perform a data transfer process with a first electronic device entered in a predetermined range, the second wireless communication circuitry being different from a first wireless communication circuitry;
   determining whether or not the first electronic device has moved out of the predetermined range in a case where the data transfer process is in progress;
   determining whether or not a second electronic device has entered in the predetermined range after the first electronic device has moved out of the predetermined range;
   determining whether or not the second electronic device entered in the predetermined range and the first electronic device moved out of the predetermined range are the same;
   determining whether or not the data transfer process is in progress in a case where the second electronic device entered in the predetermined range and the first electronic device moved out of the predetermined range are the same; and
   causing a wireless power transmission circuitry to transmit power to the second electronic device in a case where the second electronic device entered in the predetermined range and the first electronic device moved out of the predetermined range are the same and the data transfer process is not in progress.

19. A non-transitory storage medium that stores a program causing a computer to execute a method, the method comprising:
   causing a second wireless communication circuitry to perform a data transfer process with a first electronic device entered in a predetermined range, the second wireless communication circuitry being different from a first wireless communication circuitry;
   determining whether or not the first electronic device has moved out of the predetermined range in a case where the data transfer process is in progress;
   determining whether or not a second electronic device has entered in the predetermined range after the first electronic device has moved out of the predetermined range;
   determining whether or not the second electronic device entered in the predetermined range and the first electronic device moved out of the predetermined range are the same;
   determining whether or not the data transfer process is in progress in a case where the second electronic device entered in the predetermined range and the first electronic device moved out of the predetermined range are the same; and
   causing a wireless power transmission circuitry to transmit power to the second electronic device in a case where the second electronic device entered in the predetermined range and the first electronic device moved out of the predetermined range are the same and the data transfer process is not in progress.

* * * * *